April 8, 1930.  J. M. SCHUTZ  1,753,972
CENTRIFUGAL APPARATUS
Original Filed Feb. 5, 1924   2 Sheets-Sheet 1

Inventor:
Joseph Martin Schutz
By C. A. Mason, Attorney

April 8, 1930.　　　J. M. SCHUTZ　　　1,753,972
CENTRIFUGAL APPARATUS
Original Filed Feb. 5, 1924　　2 Sheets-Sheet 2
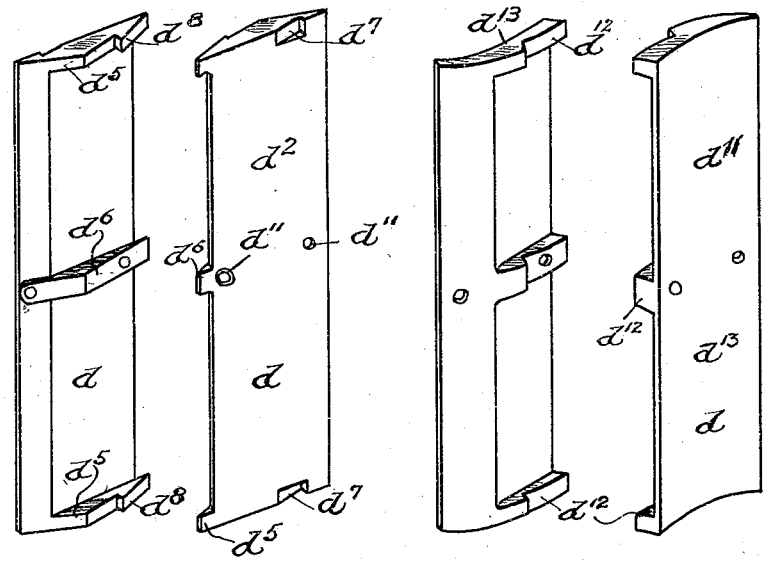
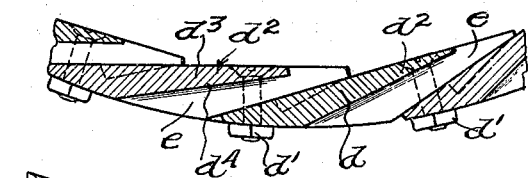
Fig. 8.
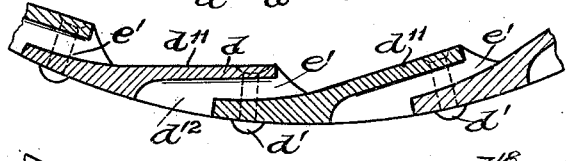
Fig. 9.
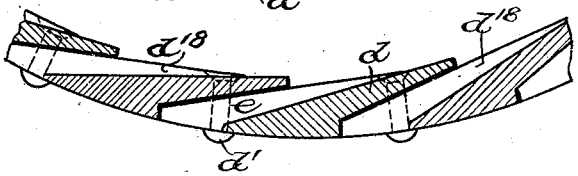
Fig. 10.
Inventor:
Joseph Martin Schutz
By C. A. Mann Attorney.

Patented Apr. 8, 1930

1,753,972

UNITED STATES PATENT OFFICE

JOSEPH MARTIN SCHUTZ, OF CHICAGO, ILLINOIS, ASSIGNOR, BY MESNE ASSIGNMENTS, TO CENTRIFIX CORPORATION, OF CLEVELAND, OHIO, A CORPORATION OF OHIO

CENTRIFUGAL APPARATUS

Original application filed February 5, 1924, Serial No. 690,861. Patent No. 1,539,435. Divided and this application filed March 3, 1925. Serial No. 12,899.

This application is a division of my original application S. No. 690,861, filed February 5, 1924.

Figure 1:
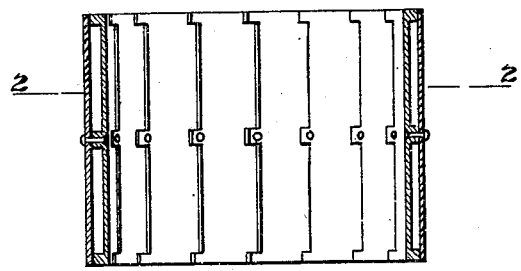
Figures 2, 3:
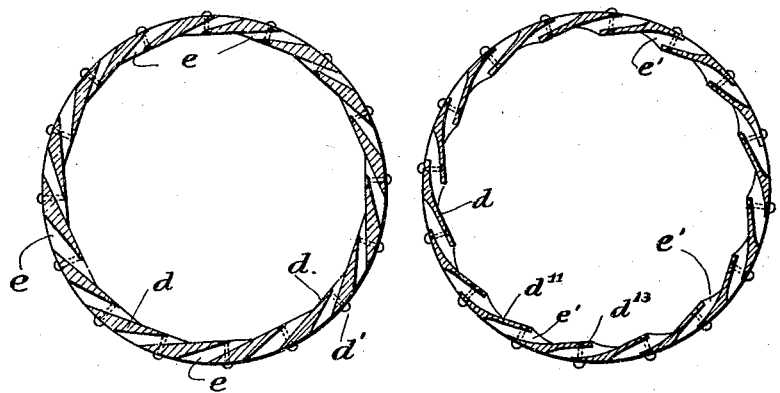

My original application is concerned with certain so-called centrifugal units which, being employed as an avenue for the movement of a flowing stream of any fluid, have the effect of setting the stream into rapid rotation, and, as a consequence of such rotation, bringing about a centrifugal separation of the heavier from the lighter constituents of the fluid. The subject matter of the present application is a component part of said unit, namely, a multiply tuyèred ring through which the fluid moves from the outer to the inner side and by which the fluid is so directed as to occasion its rapid rotation within the tuyère ring. The present invention is concerned with a particularly advantageous form or construction of the multiply tuyèred ring and will be fully understood on reference to the accompanying drawings in which Fig. 1 is a side elevation of a tuyère ring embodying the present invention; Fig. 2 is a cross-section thereof on the line 2—2 of Fig. 1; Fig. 3 is a similar cross-sectional view illustrating a ring of slightly modified form; Figs. 4 and 5 are obverse and reverse perspective views of one of the staves, many of which are used in making up the complete ring of Fig. 2; Figs. 6 and 7 are like views of one of the staves composing the ring of Fig. 3; Fig. 8 is an enlarged sectional detail taken from Fig. 2; Fig. 9 is a like view taken from Fig. 3, and Fig. 10 illustrates a modification of the stave construction shown in Figs. 2 and 8.

The tuyère ring as a whole comprises a circumferential series of inwardly directed operatively overlapping slit-like tangential tuyères, all having the same direction. The tuyères proper are marked $e$. They are formed by the spaces between the tangentially positioned tuyère blades or staves $d$. The latter are fastened one to the other in series and thus the ring is completed.

When fluid under pressure is supplied to a space external to the tuyère ring it passes tangentially into the same in the form of many thin films or streams. Obviously, these have a common direction, and in consequence of this direction and the velocity of fluid movement there is immediately set up within the ring a rapid rotation of the whole fluid content of the ring. As explained in my original application, all particles contained by the fluid and which are heavier than the same are therefore centrifugally projected upon the inner side of the staves or blades and are held in that position by centrifugal force until they are longitudinally disturbed or moved by a longitudinal displacing force, and such force is availed of to deliver the heavier substances to one of the ends of the tuyère ring, from which point it is discharged, while the purified fluid is permitted to escape along the axis of the ring.

For reasons of convenience, durability and economy the staves or blades of the tuyère ring are made in the novel manner and form herein shown. In its simplest form a ring component or blade or stave is preferably a metal casting and is thinly triangular in cross-section. In spacing them apart to provide the tuyère openings, each stave is provided with integral spacing projections or lands and those of one space interfit with the next stave. The lands are positioned upon either the inner or outer sides of the stave as contrasted in Figs. 8 and 10, as may best accord with the method adopted in moulding them in quantities.

Figs. 2, 4, 5 and 8 represent staves of the thinly triangular cross-sectional shape above mentioned. Each such stave presents a flat inner side or face $d^2$. Its pattern may therefore be laid flat on a mould-board. The triangular cross-section of the body portion $d^3$ of the stave $d$ best appears in each of the staves shown in Fig. 8. On the opposite side $d^4$ of each stave are three projecting ribs or lands $d^5$, $d^5$ and $d^6$. The end lands $d^5$ are identical. Referring to the other side of the stave, the inner face $d^2$ is provided at its ends with notches or sinks $d^7$ that receive projecting lugs $d^8$ of the lands $d^5$. These staves are thus interlocked against relative transverse and longitudinal movement. The face of the middle land $d^6$ is flat. It merely approaches or bears against the flat face of the next stave. The middle land of each stave contains two bolt or rivet holes $d^{11}$, and, as shown, each interfitting blade is secured to the next blade or stave by means of a short bolt or rivet $d^1$. The heads of the bolts or rivets are countersunk in the inner face $d^2$ of the stave so as not to form an obstruction thereon. In each case the hole at one end of the stave is drilled perpendicularly to the surface of that edge, this being for convenience in machining the parts, and this is the only machine work proper that need be performed on the stave. The ends of the stave are merely ground flat, usually after the ring is assembled by means of the connecting bolts or rivets.

Where certain substances are to be handled, it is desirable that the entering streams or films shall be instantly deflected. For such uses the staves $d$ may be made in the interlocking shapes shown in Figs. 6, 7 and 9. Their inner faces $d^{11}$ are curved and their backs correspondingly formed with the curved lands $d^{12}$. Thus the tuyère openings $e'$, see Fig. 3, are made almost truly tangential to the inner periphery of the ring as a whole, and in each case the substance flowing through the tuyère $e'$ meets and is suddenly deflected by the instanding portion or edge $d^{13}$ of the next blade.

The method of interlocking the staves by means of the employed lands is only varied in the shapes thereof. The method of bolting or riveting the staves together is not changed from that before described.

The instances of the occurrence of the lands on the inner faces of the staves are common, and such lands are well represented in Fig. 10, where the obverse lands are marked $d^{13}$. They are not changed in function and do not require further description.

In all forms of this invention the operating pressures on the inner and outer sides of the staves or blades is substantially the same. Therefore a pressure resisting ring structure is not required and it becomes possible to build up the complete ring from simple cast metal staves which are self interlocking and with each stave fastened to the next by a single and relatively small device. The structure thus becomes of such low cost as to permit its very general and extended use.

Having thus described my invention, I claim as new and desire to secure by Letters Patent—

1. The herein described multiply tuyèred self-completed ring component comprising a cast metal blade having end and intermediate spacing and self interlocking lands and provided with fastener holes in each intermediate land.

2. The herein described multiply tuyèred ring, comprising a circumferential series of angularly positioned blades all having the same direction, abruptly shouldered interlock spacing lands integral with each blade and successively interlocked one with another, serving to space the blades one from the other and thus forming a corresponding circumferential series of tuyères, and separable fastenings positioned intermediate the ends of the tuyères and serving to fasten each blade to the next blade in series.

In testimony whereof, I have set my hand this 26 day of February, 1925.

JOSEPH MARTIN SCHUTZ.